United States Patent [19]

Cookson

[11] 4,081,599

[45] Mar. 28, 1978

[54] PIPE COUPLING AND METHOD FOR USING SAME

[75] Inventor: Alan H. Cookson, Southboro, Mass.

[73] Assignee: Westinghouse Electric Corporation, Pittsburgh, Pa.

[21] Appl. No.: 714,216

[22] Filed: Aug. 13, 1976

[51] Int. Cl.² .................. H01B 9/06; F16L 17/00
[52] U.S. Cl. .................................. 174/21 C; 174/13; 285/96; 285/187; 285/226; 285/364; 285/286; 285/369
[58] Field of Search .................. 285/96, 112, 369, 97, 285/226, 47, 187, 138, 422, 286; 277/34, 72 R; 174/13, 21 R, 21 C, 21 CA, 22 C

[56] References Cited

U.S. PATENT DOCUMENTS

| 2,209,325 | 7/1940 | Dennis | 285/96 X |
| 2,502,351 | 3/1950 | Smith | 285/422 X |
| 2,523,716 | 9/1950 | Parr | 285/369 X |
| 2,582,249 | 1/1952 | Hendel | 285/422 X |

FOREIGN PATENT DOCUMENTS 124,185  3/1949  Australia ..................... 174/22 C Primary Examiner—Dave W. Arola
Attorney, Agent, or Firm—M. S. Yatsko

[57] ABSTRACT

A coupling for sealingly joining together two sections of gas-containing pipe. The coupling comprises an annular housing having two end sections with an inside diameter substantially the same as the pipe outside diameter, and an intermediate section with an inside diameter greater than the pipe outside diameter and forming an annular space therebetween. The two end sections are capable of being welded to the pipe, and into the annular intermediate space is inserted an annular elongated C-shaped sleeve. Also included are pressurization means for compressing the sleeve against the pipe sections to seal the joint therebetween.

8 Claims, 2 Drawing Figures

PIPE COUPLING AND METHOD FOR USING SAME

BACKGROUND OF THE INVENTION

This invention relates generally to couplings for gas-containing pipe, and more particularly to a coupling for use in joining two sections of compressed gas insulated transmission line, and a method for utilizing the coupling.

Gas insulated high voltage power transmission lines consist generally of a conductor supported by insulating spacers inside a metal enclosure or pipe which is pressurized with insulating gas, typically sulfur hexafluoride, at pressures such as 45 lbs. per square inch gauge. Presently, these system are constructed from short sections up to 60 feet long which must be joined together. The conductor joint is usually welded or has finger contacts, but the joint of the enclosure or pipe is a major problem as it must be easy and quick to assemble, reliable, gas tight for long periods of time, such as 25 years, low in cost, have some flexibility to account for misalignment of the pipe sections, and provide good electrical contact between adjacent links of pipe.

In particular, it would be an advantage to be able to easily dismantle any section of piping for inspection after a high voltage failure such as an electrical breakdown. These electrical failures are most likely to occur during high voltage field testing following the transmission line installation, but prior to putting the transmission line into service. These electrical breakdowns usually occur because of particle contamination in the system, wherein the particles are either left in the system or produced because of incorrect assembly procedures. If electrical breakdown failures occur, it is necessary to dismantle the failed section to remove the particles and clean any tracking marks on the support insulators caused by the breakdown.

Prior art joints are generally either welded or flanged. Welded joints are relatively low in cost, but have the disadvantage in that they cannot be easily dismantled for inspection purposes. Flanged joints are generally easily dismantable, but are more expensive than welded joints, typically by a factor of three. Also, flanged joints generally require electrical connecting means between pipe sections to provide electrical continuity along the transmission line.

One pipe coupling utilized to sealingly join two sections of gas-containing piping, although it has not been used for gas insulated transmission lines, is the coupling illustrated in U.S. Pat. No. 3,420,554 to Straub. In this coupling, a rubber sleeve is inflated inside a steel case at the joint between the pipes by injecting a special pressurizing fluid through a valve. The rubber sleeve seals tightly against both ends of the pipe. A rubber collar is utilized to keep the rubber sleeve central, and a spring is used to retain the sleeve. These couplings have the advantage of flexibility, the pipe ends need not be specially prepared, and the joints are relatively easy to assemble and dismantle. However, there are disadvantages to this coupling in that it may not seal for the long periods of time necessary for gas insulated transmission lines, electrical connections must be made between the pipe sections, and the pipe sections themselves must be physically retained under pressure. Additionally, the cost of these couplings is of the same order of magnitude as the flanged joints.

SUMMARY OF THE INVENTION

The aforementioned problems of the prior art are eliminated by this invention by providing a coupling for sealingly connecting two sections of gas-containing pipe. The coupling comprises an annular, elongated housing having two end sections and an intermediate section. The end sections have an inside diameter substantially the same as the pipe's outside diameters, and are capable of being welded to the associated pipe section. The intermediate section has an inside diameter greater than the pipe's outside diameters, and forms an annular space therewith. Disposed within this annular space is an annular elongated elastic sleeve, and the sleeve has radially outward extensions at the longitudinal ends thereof. The sleeve extensions extend to the intermediate section housing, and have longitudinal elements extending toward each other adjacent the intermediate section. The sleeve, sleeve extensions, and longitudinal elements form a cavity therebetween. Also included are means for pressurizing the cavity, which compresses the sleeve against the pipe sections and seals the pipe joint.

The coupling is especially useful to sealingly join two sections of compressed gas insulated transmission lines. Two line sections of the transmission line are joined together utilizing the above-described coupling. The sleeve is then compressed against the transmission lines to seal the joint therebetween, a high voltage test is conducted on the transmission line to test same, and after the test is completed the end sections of the housing are welded to the outer sheath to provide permanent sealing of the joint. After the end sections are welded, the transmission line can be connected to system voltage.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
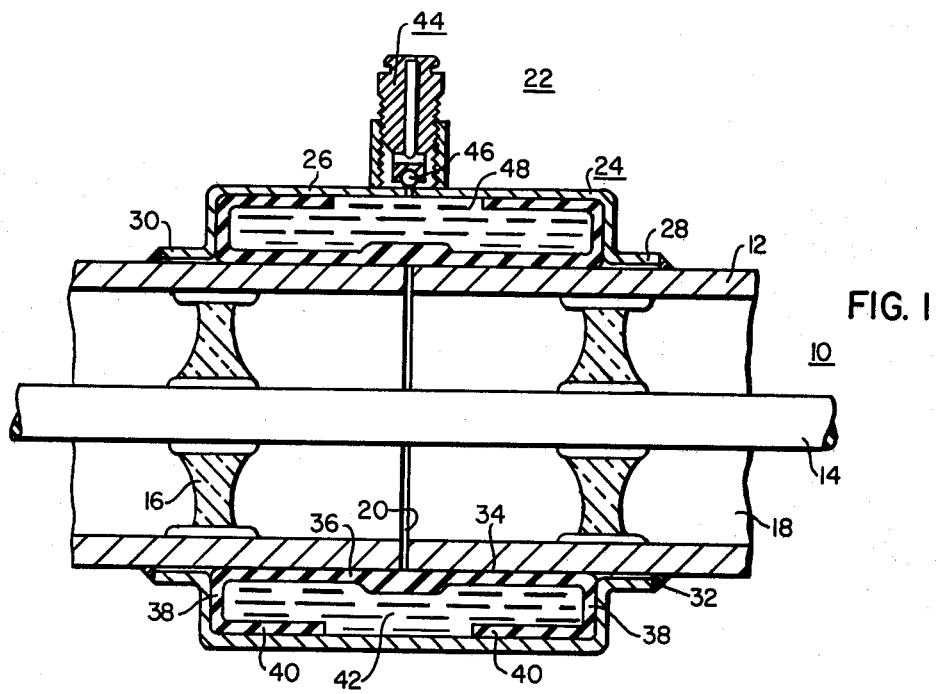
FIG. 1 is a sectional view of the coupling of this invention utilized with a compressed gas insulated transmission line.

Referring now more particularly to FIG. 1, there is shown the coupling of this invention used to join two line sections of a compressed gas insulated transmission line. Although the following description is directed toward a compressed gas insulated transmission line, it is to be understood that the coupling of this invention may be utilized to sealingly join together any two pipe sections. Also, although the description is directed to pipe sections having the same outside diameter, it is to be understood that the coupling may be utilized to join pipe sections of differing outside diameters.

A compressed gas insulated transmission line is comprised typically of a plurality of individual line sections 10. Each line section 10 is comprised of a cylindrical outer sheath or pipe 12, and electrical conductor 14 supported within said pipe 12 by insulating support 16, with an insulating gas 18, typically sulfur hexafluoride disposed within the pipe 12. Between adjacent line sections 10, and more particularly between adjacent outer sheaths 12, is formed a joint 20. It is this joint 20 which must be sealed to prevent the escape of the insulating gas 18 from within the pipe 12.

The joint 20 is sealed by utilizing the coupling 22. The coupling 22 comprises an annular, elongated housing 24, which may be made of steel or aluminum, comprised of an intermediate section 26 and two end sections 28 and 30. The two end sections 28, 30 have an inside diameter substantially the same as the pipe 12 outside diameter, and the end sections 28, 30 are capable of being welded to the pipe 12 by welds 32. The intermediate section 26 has an inside diameter greater than the pipe 12 outside diameter, and the pipe joint 20 is longitudinally positioned along the housing 24 within the intermediate section 26. The intermediate section 26 and the pipe sections 12 form an annular space 34 therebetween. Within this annular space 34 is disposed an annular, elongated, elastic sleeve 36 which is typically of rubber or high temperature gasket material.

The sleeve 36 is disposed within the annular space 34 adjacent to the pipe joint 20. The sleeve 36 includes radially outwardly extensions 38 at the longitudinal ends thereof, with the sleeve extensions 38 extending to the housing intermediate section 26. The sleeve extensions 38 have longitudinal elements 40 at their ends thereof, and the longitudinal elements 40 extend toward each other adjacent to the intermediate section 26. The sleeve 36, sleeve extensions 38, and longitudinal elements 40 having a generally C shape form a cavity 42 therebetween. Also included within the coupling 22 is a means 44 for pressurizing the cavity 42. The pressurization of the cavity 42 compresses the sleeve 36 against the pipe sections 12, and seals the pipe joint 20.

The pressurizing means 44 is comprised of closable inlet means 46 such as a reusable valve, which extends through the housing intermediate section 26 and into communication with the cavity 42. Also included is a pressurizing fluid 48 which is inserted into the cavity 42 through the closable inlet means 46. The pressurizing means 44 operates substantially as follows. The pressurizing fluid 48, which may be glycerin, a synthetic plastic, or may be a gas, is inserted into the cavity 42 through the valve 46. As additional fluid 48 enters the cavity 42, the pressure within the cavity 42 increases, which causes the sleeve 36 to be tightly compressed against the pipe 12. This compression of the sleeve 36 against the pipe sections 12 seals the joint 20 between the pipe sections 12.

The coupling above described is especially useful in the installation of a high voltage gas insulated transmission line. Two line sections 10 of the transmission line are joined together by inserting the outer sheaths 12 within the coupling 22. After the two outer sheaths 12 are within the coupling 22, the cavity 42 is pressurized by the pressurizing means 44, compressing the sleeve 36 against the outer sheaths 12 to seal the joint 20 therebetween. After the joint 20 has been sealed, a test voltage is connected to the electrical conductors 14 to test the installation. If during the testing, the transmission line experiences a breakdown, the joint can be easily dismantled by depressurizing the cavity 42 and removing the line sections 10 from within the coupling 22. If the test of the transmission line is satisfactory, the cavity 42 need not be depressurized. Instead, the inlet means 46 are closed, and the end sections 28, 30 of the housing 24 are secured to the outer sheaths 12 by welds 32 during welding. The sleeve 36 prevents weld splatter from entering the inside of the pipe sections. This welding of the end sections 28, 30 to the outer sheaths 12 provides for a permanent sealing of the joint 20 without the uncertainties as to whether the pressurization of the cavity 42 could seal the joint 20 for substantial periods of time. After the welding of housing end sections 28, 30 to the outer sheaths 12 is accomplished, the transmission line can then be connected to system voltage.

Figure 2:
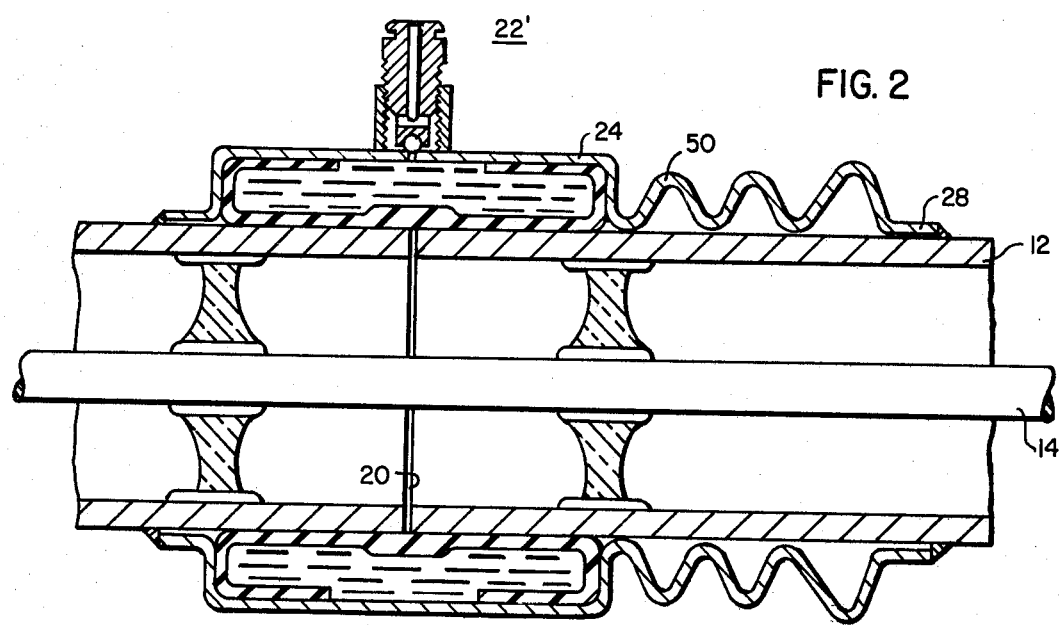
FIG. 2 is a modification of the coupling shown in FIG. 1.

Referring now to FIG. 2, there is shown a modification of the coupling 22 illustrated in FIG. 1. In this modification, the coupling 22' is similar to that heretofore described, with the exception that at least one of the end sections 28 is corrugated and the pipe joint 20' is enlarged to allow for thermal expansion. The corrugations 50 allow for thermal expansion of the outer sheath 12 without sacrificing the sealing of the joint 20'. The corrugations 50 also allow some flexibility after the end section 28 has been welded to the outer sheath 12 for, as an example, alignment purposes. This modified coupling operates the same as the previously described coupling, and the installation of the transmission line can occur as described.

Thus, it can be seen that this invention provides a coupling for sealing joining two sections of pipe having a gas disposed therein, and provides a method for utilizing the coupling in the installation of a compressed gas insulated transmission line.

I claim as my invention:

1. A coupling for sealingly connecting two sections of pipe having a gas disposed therein, said pipe sections having an outside diameter, said pipe sections being outer sheaths of a high voltage gas-insulated transmission line and having an electrical conductor insulatably supported therein, said coupling comprising:

an annular, elongated housing comprising two circumferentially continuous end sections and an intermediate section therebetween longitudinally connecting said two end sections, said end sections having an inside diameter substantially the same as said pipe outside diameter and capable of being welded thereto, said end sections extending longitudinally outwardly from said intermediate section, said intermediate section having an inside diameter greater than said pipe outside diameter, said pipe sections being disposed within said housing and forming a joint between said pipe sections, said joint being longitudinally positioned along said housing within said intermediate section, said intermediate section and said pipe sections forming an annular space therebetween;

an annular, elongated, elastic sleeve disposed within said annular space adjacent said pipe joint and contacting said pipe sections, said sleeve having radially outward extensions at the longitudinal ends thereof, said sleeve extensions being spaced from said pipe sections and extending to said housing intermediate sections and having longitudinal elements extending towards each other adjacent said intermediate sections, said longitudinal elements being radially spaced from said sleeve, said sleeve, sleeve extensions, and longitudinal elements forming a generally C-shaped configuration and having a cavity therebetween; and means for pressurizing said cavity, the pressurization of said cavity compressing said sleeve against said pipe sections and sealing said pipe joint.

2. The coupling according to claim 1 wherein one of said end sections is corrugated.

3. The coupling according to claim 1 wherein said sleeve is made of a material comprising rubber.

4. The coupling according to claim 1 wherein said housing member is made of a material comprising aluminum.

5. The coupling according to claim 1 wherein said pressurizing means comprises:
   closable inlet means secured to said housing and in fluid communication with said cavity through said housing; and
   a pressurizing fluid disposed within said cavity, said fluid entering said cavity through said inlet means.

6. A method of installing a high voltage gas insulated transmission line, said transmission line including a plurality of separate line sections, each line section including an outer sheath, an electrical conductor insulatably supported within said outer sheath, and an insulating gas disposed within said outer sheath, said method comprising the steps of:
   joining two line sections together utilizing a coupling to sealingly join two outer sheaths together, said coupling comprising an annular elongated housing having two circumferentially continuous end sections and an intermediate section therebetween longitudinally connecting said two end sections, said end sections extending longitudinally outwardly from said intermediate section and an annular elongated elastic C-shaped sleeve having a longitudinally continuous section disposed within said housing intermediate section and adjacent said outer sheath joint, the longitudinally continuous section of said C-shaped sleeve contacting said outer sheaths;
   compressing said sleeve against said outer sheaths to seal the joint between said outer sheaths;
   applying a voltage to said conductors to test said transmission line; and
   welding said housing end sections to said outer sheath sections.

7. The method according to claim 6 including the step of connecting system voltage to said gas insulated transmission line after the step of welding.

8. The method according to claim 6 wherein said sleeve and said housing intermediate section form a cavity therebetween; and
   the step of compressing comprises inserting a pressurizing fluid into said cavity to pressurize the cavity, the pressurization of said cavity compressing said sleeve against outer sheath.

\* \* \* \* \*